United States Patent [19]

Cook

[11] 3,837,288

[45] Sept. 24, 1974

[54] ACCUMULATIVE TROLLEY CONVEYOR

[75] Inventor: Frank M. Cook, San Mateo, Calif.

[73] Assignee: The Cincinnati Butchers' Supply Company, Cincinnati, Ohio

[22] Filed: Oct. 24, 1973

[21] Appl. No.: 409,043

[52] U.S. Cl................. 104/162, 104/89, 104/93, 198/221
[51] Int. Cl............................. B61b 13/12
[58] Field of Search............. 104/162, 250, 89, 93; 198/221

[56] References Cited
UNITED STATES PATENTS

| | | | |
|---|---|---|---|
| 2,696,122 | 12/1954 | Clark | 198/221 X |
| 3,450,060 | 6/1969 | Adams et al. | 104/162 X |
| 3,499,394 | 3/1970 | Lambert et al. | 104/162 |

Primary Examiner—Lloyd L. King
Assistant Examiner—Randolph A. Reese
Attorney, Agent, or Firm—J. Warren Kinney, Jr.

[57] ABSTRACT

The accumulative trolley conveyor operates to advance and space along a trolley rail a multiplicity of load-suspending trolleys, with emphasis on accuracy of spacing and maintaining complete control over all trolleys of a group, so that none may escape control and become a deterrent to the orderly and accurate disposition of trolleys along the accumulative rail.

24 Claims, 11 Drawing Figures

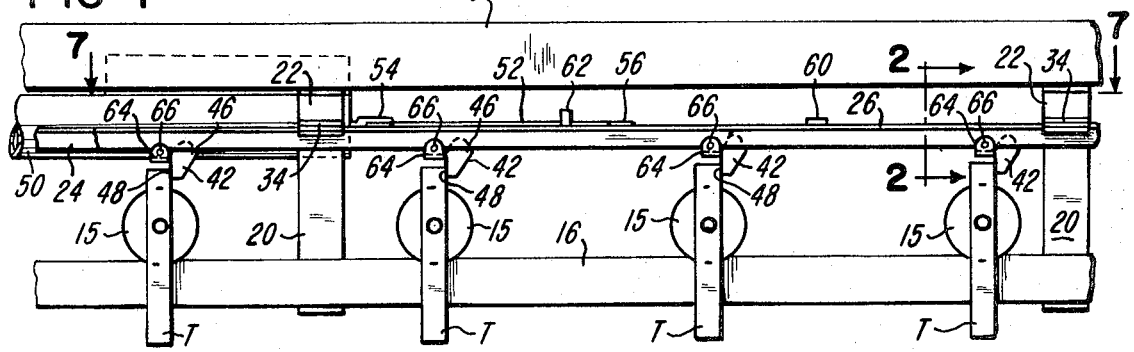
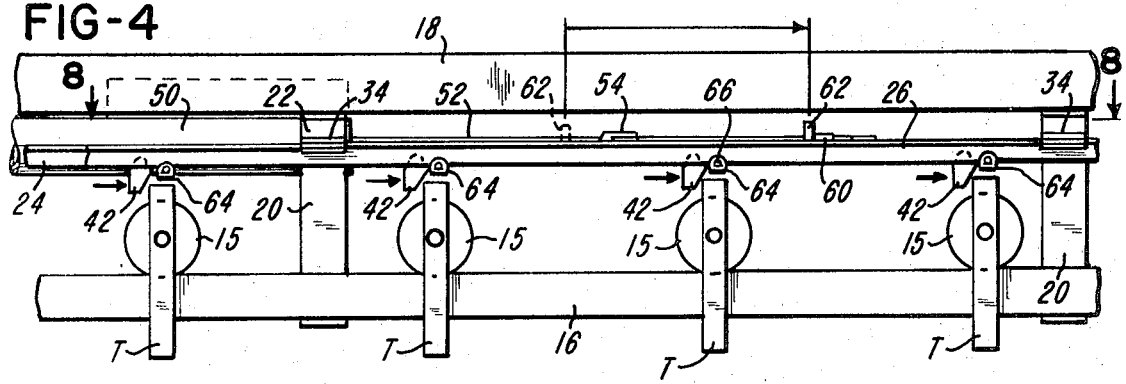
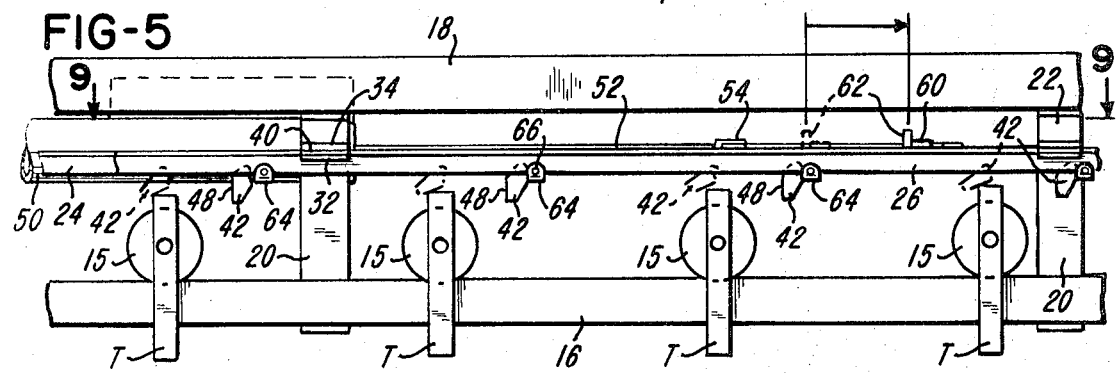
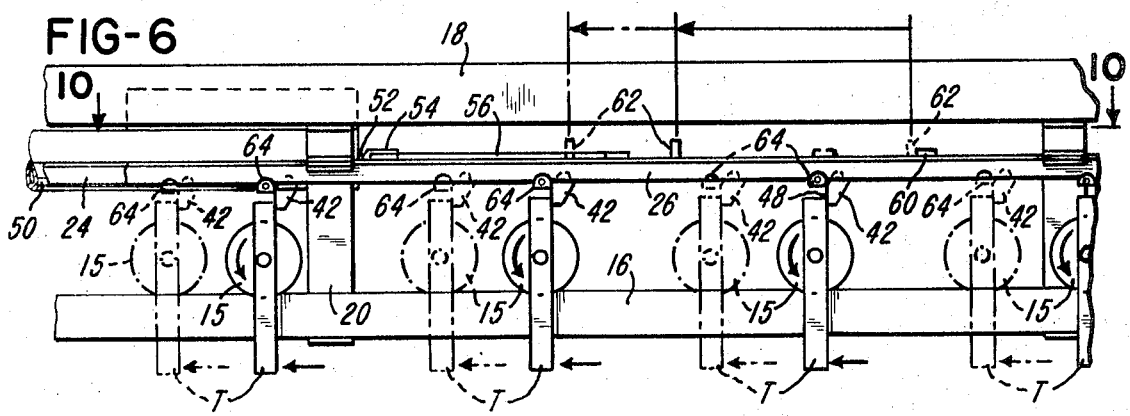

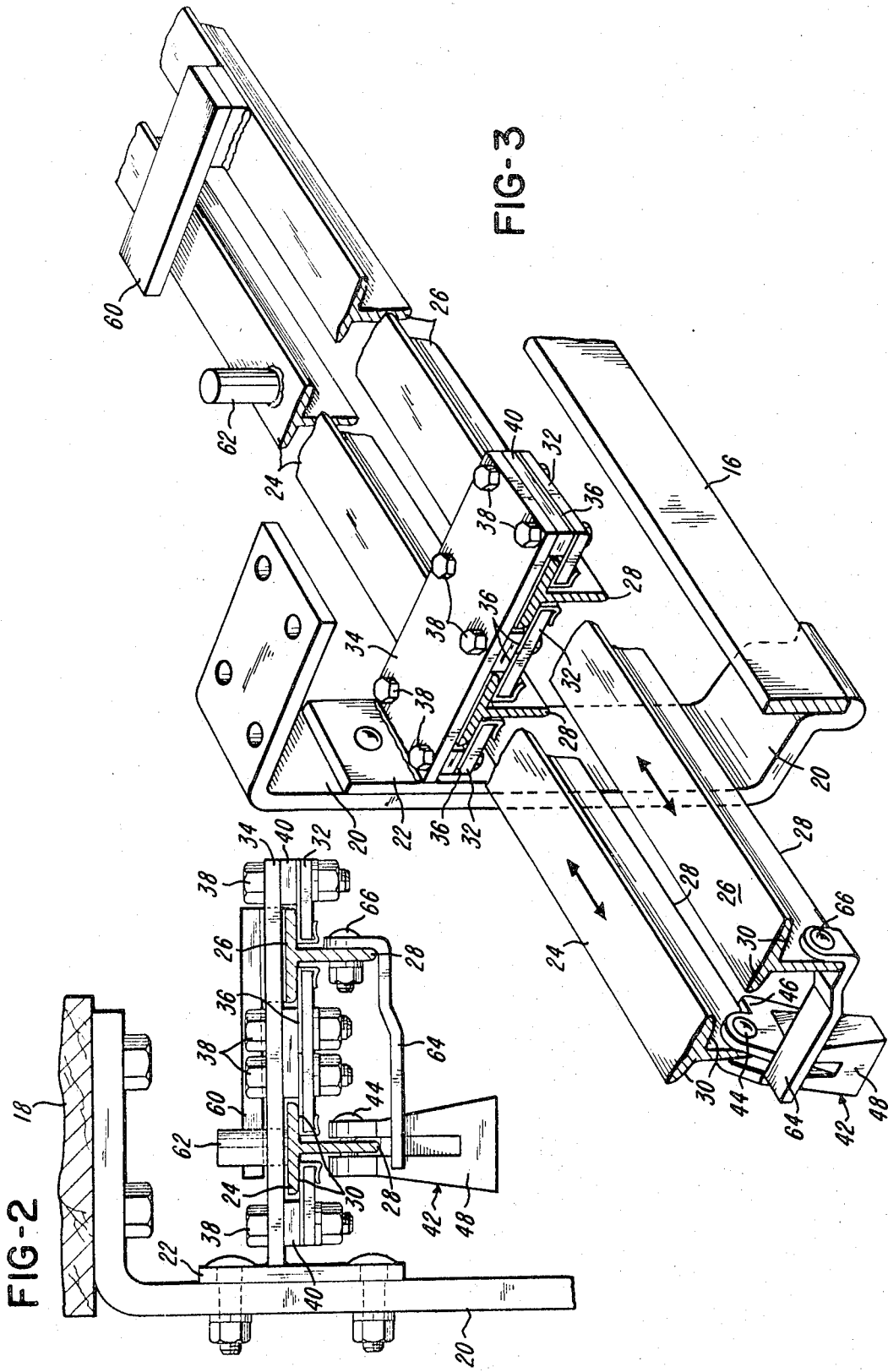

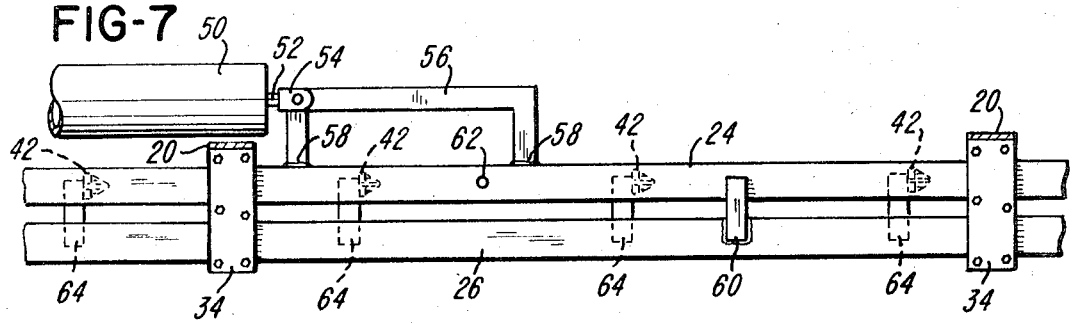
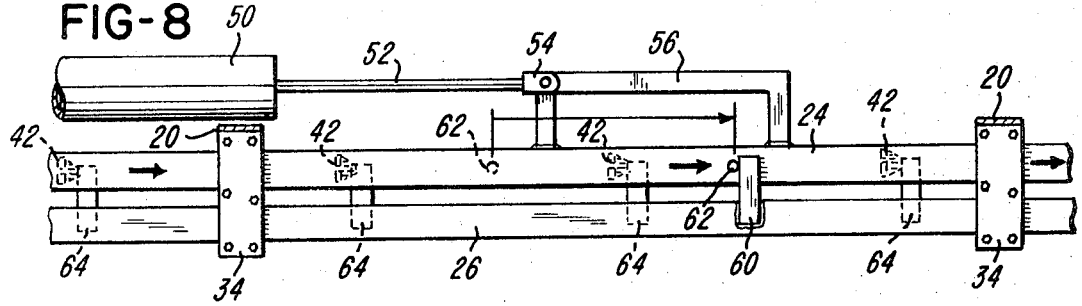
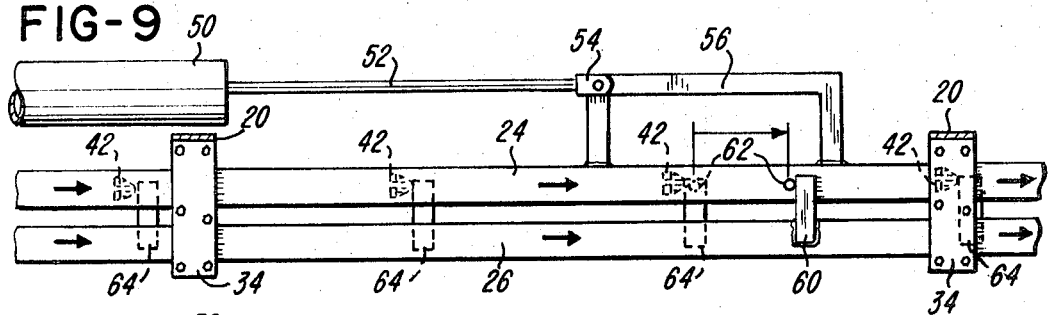
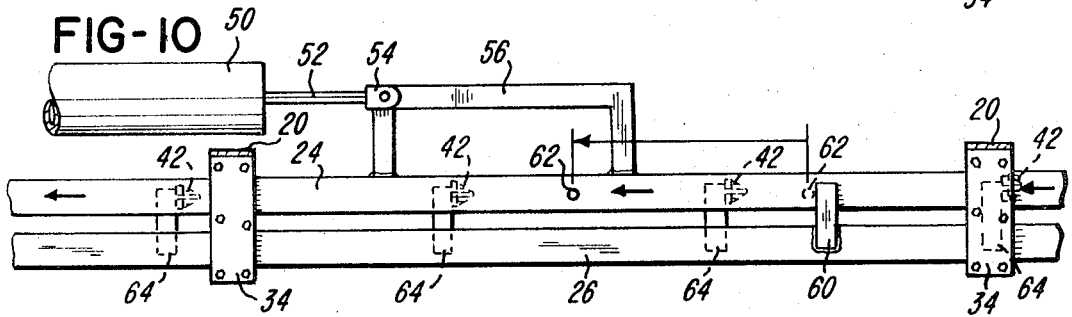
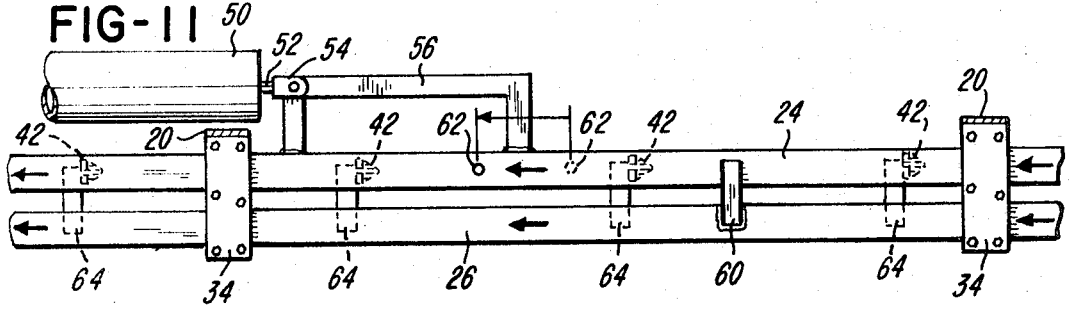

3,837,288

ACCUMULATIVE TROLLEY CONVEYOR

BACKGROUND OF THE INVENTION

Accumulative trolley conveyors have been in use quite generally in meat packing plants, for the purpose of temporarily storing or holding animal carcasses under refrigeration within a large storage room or compartment. The carcasses usually were conveyed to the compartment upon a multiplicity of wheeled trolleys, each of which carried a carcass above floor level usually by which carried it at a hind leg from a trolley hook.

The storage compartment was equipped with spaced parallel overhead trolley rails, and suitable means were provided for automatically or semi-automatically shunting loaded trolleys onto the parallel rails from a source of supply. The object was to accumulate loaded trolleys upon the rails, with the trolleys and their carcasses spaced apart, but in a manner such as to waste no storage space. To accomplish this objective, it was important to achieve an accurate spacing of trolleys, and to prevent the trolleys from escaping control while undergoing directive advancement onto the accumulative rails.

Equipment for accomplishing the above-mentioned purposes and objectives is exemplified in each of U.S. Pat. Nos. 3,499,394; 3,450,060 and in the co-pending patent application of Wilson H. Swilley, Ser. No. 403,227 filed Oct. 3, 1973 and assigned to the assignee of the present application.

Each of the references discloses means for advancing loaded trolleys in spaced relation along an overhead rail, for cumulative purposes. The trolleys are step-advanced by means operative upon a walking beam or the like which carries a multiplicity of trolley pushers each adapted to engage, advance, and space a number of trolleys simultaneously upon an accumulative rail.

SUMMARY OF THE INVENTION

An object of the present invention is to improve the operation of an accumulative conveyor by providing means to place the loaded trolleys under the greatest possible control while advancing them along the trolley rail, in order to maintain a high degree of accuracy in spacing, and eliminate or greatly minimize the opportunity for trolleys to escape control during accumulation. Whenever trolleys are out of control, they may overcrowd the rails within the cooling compartment, or may leave voids thereon, which not only wastes storage space but interferes with the orderly handling of the stored product incident to dispensing of it from the storage room.

The present invention employs a typical reciprocatory walking beam carrying a multiplicity of pivoted drop-fingers or pushers, which upon each advancement of the beam, may engage trolleys to advance them simultaneously a predetermined distance along an adjacent horizontal trolley rail. The drop-fingers or pushers heretofore were allowed the freedom to swing about their suspension pivots, except when actually engaged by a trolley harp during trolley advancement.

According to the present invention, the pivoted pushers are placed under the control of a series of lock bars which act to preclude the possibility of swing, particularly when the trolleys during advancement may momentarily break contact with the pushers. This loss of contact will occur if the carcass is swinging, and imparting its momentum to the trolley. The result is an erratic advancement of the trolley even though the pusher advancement may be regular, smooth and uniform, and at such times as the trolley momentarily leaves the pusher, the pusher may override the trolley harp and thereby lose all control of the trolley. This form of mishap, and others resulting from drop-fingers or pushers being allowed full freedom of movement, are effectively overcome by the control means of the invention.

The lock bars mentioned are equal in number to the number of pushers, and are carried by a slave member or beam which parallels the walking beam and moves therewith during a portion of the walking beam movements. The drive between the powered walking beam and the slave beam, which latter is an idler, is such that the pushers are rendered free to swing at the critical time when they are required to override stationary trolleys that are next to be advanced. The details of this are to be found in the description of the preferred embodiments, which follows.

BRIEF DESCRIPTION OF THE DRAWINGS

FIG. 1 is a side elevational view of an accumulative trolley conveyor embodying the means of the present invention, and showing a group of trolleys having been advanced and spaced apart at the end of an operating cycle.

FIG. 2 is an enlarged cross-section taken on line 2—2 of FIG. 1.

FIG. 3 is an isometric view partly in cross-section, showing the structure of FIG. 2.

FIG. 4 is a view similar to FIG. 1, showing the same apparatus at one stage of operation.

FIG. 5 is a similar view showing the apparatus at a second stage of operation.

FIG. 6 is a similar view showing the trolleys uniformly advanced and spaced apart, as the apparatus is restored to the FIG. 1 starting position.

FIGS. 7, 8, 9, and 10 are top plan views of FIGS. 1, 4, 5, and 6, respectively.

FIG. 11 is a view identical to FIG. 7, but indicating by means of arrows, a final disposition of elements embodied in the apparatus.

DESCRIPTION OF THE PREFERRED EMBODIMENTS

In all of the drawing views, the letters T indicate trolleys or carriages which are supported on wheels 15 riding upon an overhead horizontal rail or track 16, and which are adapted to convey articles or loads suspended therefrom as by means of hooks, slings or the like, not shown. In the example shown, the trolleys are to be advanced in step by step fashion along rail 16, from right to left, always with a predetermined spacing of the trolleys from one another. Rail 16 may be considered an accumulator rail, for its purpose is to accept and store, along its considerable length, a multitude of trolleys and their loads within a compartment or storage room of substantial size. The compartment may house many accumulator rails arranged in parallelism, with each rail embodying the means of the present invention. The apparatus may be employed very effectively in the handling of meat carcasses and the like.

Rail 16 may be suspended from a ceiling member 18 by means of a series of rigid trolley rail hangers 20 spaced at suitable intervals along the length of the rail.

The hangers may carry also a series of fixed bearing brackets 22 serving to support the operating means for step-advancing the trolleys. Any and all trolleys within the reach of the operating means, are advanceable simultaneously from right to left in the example shown.

The bearing brackets 22 are adapted to slidingly support a long horizontal primary walking beam 24 and a long horizontal slave or secondary beam 26, which extend in spaced parallelism along the length of the trolley rail in substantial parallelism therewith. Said beams move in parallelism, but not always in unison.

Althoughth the beams 24 and 26 are shown as identical T-members herein, one or both may be of other cross-sectional shape if desired. According to the example illustrated, each T-member has a vertical web 28, and a flat head providing lower bearing surfaces 30, 30 extending outwardly in opposite directions from the web. Said bearing surfaces are slidingly supported by subjacent coplanar bearing plates 32, 32, 32, which are rigidly attached to the horizontal head 34 of bracket 22. If desired, slidability of the beams may be enhanced by covering the bearing areas of plates 32 with an inherently slippery self-lubricating material 36, an example of which is polytetrafluoroethylene. The bearing plates may be secured to bracket head 34 by means of a series of bolts 38, the head and the plates being separated by spacers 40 which ensure free reciprocation of the beams 24, 26, individually.

The web 28 of walking beam 24 carries a plurality of drop-fingers or pushers 42, each of which is swingable upon a pivot 44 in the plane of said web. The pushers are uniformly spaced apart along the web. A typical spacing of the pushers from one another is 15 inches, for example.

Each pusher carries a heel or abutment 46 (FIG. 3), which performs as a stop against the lower edge of web 28, to limit rotation of the pusher about pivot 44 in counter-clockwise direction. When so stopped, the pusher is in an operative rigid position, with its forward contact face or area 48 disposed approximately vertically, or in position to abut and advance a trolley according to FIG. 6. Each pusher, when not restrained, may swing in clockwise direction to an inoperative position, at which the contact face or area 48 is displaced toward the lower edge of web 28 (see broken lines 48 of FIG. 5). When the pusher is so displaced, it may ride freely to the right over and beyond a trolley harp, without moving the trolley along rail 16.

Suitable power means is provided for reciprocating the walking beam 24 repeatedly, between a fully advanced position and a fully retracted position. Such means may comprise a doubleacting stationary fluid cylinder or motor 50 (FIG. 7), having a piston rod 52 terminating in a clevis 54 which connects the piston rod to a thrust member 56. Member 56 is rigidly attached to walking beam 24, as by means of welds 58 or other fastening means. By energizing the fluid cylinder to extend its piston rod 52 (FIGS. 5 and 9), the walking beam 24 may be shifted to the right, whereas a retraction of the piston rod shifts the walking beam to the left (FIGS. 6 and 11).

It is to be understood, therefore, that shifting of walking beam 24 to the right places it in a position of retraction, in readiness to execute a positive advancement of trolleys toward the left. Otherwise stated, the work stroke of walking beam 24 is to the left, during which it acts to advance the trolleys by way of pushers 42. It follows, therefore, that the stroke of the walking beam to the right is principally an idle stroke, producing no trolley movements.

The slave or secondary beam or elongate member 26 is slidable in parallelism with beam 24, and as previously noted, it may or may not have the same cross-sectional configuration. Said slave beam may carry a rigid transfer bar 60 which overlies or approximately spans the walking beam 24, to the extent that it lies in the path of movement of a drive stud 62 carried by the walking beam. The elements 60 and 62 are welded or otherwise suitably secured to their respective beams. In practice, it may be found preferable to reverse the elements 60 and 62, so that beam 24 may carry element 60, and beam 26 may carry element 62, if desired.

As shown, a shifting of walking beam 24 to the right (FIG. 3), will cause drive stud 62 to strike transfer bar 60. Further shifting of beam 24 in the same direction will obviously enforce a concurrent shifting of slave beam 26 with beam 24.

Referring again to FIG. 3, it is noted that the web of slave beam 26 carries a fixed and rigid transverse element or lock bar 64, riveted to the web at 66. Lock bar 64 extends across the web of walking beam 24 into the path of advancement of a drop finger 42, so that upon advancement of walking beam 24 to the left, drop finger 42 will strike the lock bar 64. After striking the lock bar, finger 42 in continuing to advance, will cause slave beam 26 to follow the advancement of beam 24, so that the beams will advance in unison to the left. In so advancing, the drop finger or pusher 42 may be advancing a trolley and its load along rail 16.

It should be noted here that lock bars 64 are equal in number to the number of pushers or drop fingers 42. Noted also is the fact that a lock bar 64 when in contact with a pusher 42, serves to lock the pusher against clockwise rotation about its pivot 44. The lock bars are so spaced along the slave beam, as to execute simultaneous locking of an equal number of pushers. The lock bars engage the pushers at or below the level of the pusher pivots.

The apparatus requires only one transfer bar 60 and one cooperative drive stud 62.

The relative positions of the transfer bar 60, the drive stud 62, and the series of lock bars 64 upon the beams 24 and 26, is a matter of importance in establishing a predetermined sequence of cyclic coactions of the elements. The operation is best explained by using a typical installation as an example, including approximate dimensions of stroke movements and other factors relating to disposition of elements.

First, it may be assumed that the trolleys are to be advanced upon rail 16 with a spacing between them approximating 15 inches. Therefore, the pushers or dropfingers 42 are located upon walking beam 24 at 15 inch intervals. Also, the lock bars 64 will be located at 15 inch intervals along slave beam 26, (see FIGS. 1 and 7).

The drive stud 62 and transfer bar 60 are to be so located upon their respective beams, that beam 24 may move about 13 inches before stud 62 strikes transfer bar 60, (FIGS. 4 and 8); then, the stud proceeds to drive the transfer bar and its beam 26 about 5 inches in the same direction of movement of the stud, (FIGS. 5 and 9). Thus, it will be noted that an 18 inch stroke of piston rod 52 to the right, serves to move the walking beam 18 inches and the slave beam 5 inches, in one direction; also, that the beams move concurrently only during the final 5 inches of the stroke, (see FIGS. 4, 5 and FIGS. 8, 9).

Druing the aforesaid final 5 inches of the stroke, or at a time prior thereto as determined by the positions of the trolleys upon rail 16, the drop-fingers or pushers 42 will override the trolley harps (see dotted lines 42 of FIG. 5), to assume operative positions (full lines 42) at which the pushers are in readiness to reverse travel and advance the trolleys to the left along rail 16, according to FIG. 6.

Referring to FIG. 6 and FIG. 11, it will be noted that the lock bars 64 are in the position of FIG. 3, at which they lock the pushers 42 against any possibility of clockwise rotation about pivots 44. This relationship results from an advancing movement of the walking beam 24, as driven by motor 50, causing the several pushers to strike and advance the lock bars and slave beam 26 therewith to the very end of the operating stroke (FIGS. 1 and 7) of the walking beam 24.

With the next retractile stroke of the walking beam, FIGS. 4 and 8, the pushers 42 will have moved away from the then stationary lock fingers 64, until the pushers approach the succedent lock fingers according to FIG. 4, when drive stud 62 will be found ready to drive the transfer bar 60 to the right along with the slave beam 26 and all of its lock bars 64. Completion of the retractile stroke, which involves both of the beams 24 and 26, is depicted by FIGS. 5 and 9. Then follows the advancement stroke of the walking beam as powered by motor 50, to advance, space, and reposition all of the affected trolleys T along rail 16 according to FIGS. 1 and 7, and 6 and 11.

As was previously pointed out, the advancement of trolleys is accompanied by the locking of their respective pushers or drop-fingers 42, by means of lock bars 64 which lock bars travel with the pushers during trolley advancement. The locking of the pushers or drop fingers eliminates all possibility of their swinging from the operative position at an instant when a trolley may slightly over-advance due to swinging of the load or other reason. Such unwanted swinging of any pusher or drop-finger from operative pushing position could, unless restrained, leave a trolley without proper guidance and with the ability to disrupt the orderly arrangement of trolleys along the accumulator rail.

It should be understood that movement of the lock bars 64 is dependent upon either being driven by pushers 42 or by drive stud 62 propelling the transfer bar 60. Under no circumstances will a lock bar 64 pass any pusher or its pivotal mounting 44.

Controls may be provided for repeatedly actuating the motor automatically, with overriding control by a human operator or attendant.

What is claimed is:

1. An accumulative conveyor apparatus for trolleys to be advanced and spaced apart along a trolley rail, said apparatus comprising in combination: a substantially horizontal trolley rail for the support of a plurality of load-carrying trolleys; an elongate walking beam reciprocable in parallelism with the trolley rail, and means for reciprocating said beam between fully retracted and fully advanced stroke positions; a plurality of pushers pivotally mounted upon said walking beam for swinging movement in a common plane, said pushers being uniformly spaced apart along the beam, and each including a stop to limit swinging thereof in the direction of retraction of the beam, said pushers being rigidified by the stops to abut and advance trolleys along the rail incident to shifting of said beam in the direction of advancement thereof; and lock means operative upon the pushers while the pushers are in motion with the advancing trolley, for locking the pushers in the aforesaid state of rigidity.

2. Apparatus as defined by claim 1, wherein the lock means are deactivated upon movement of the beam toward the position of retraction, to free the pushers for swinging movement.

3. Apparatus as defined by claim 2, wherein a member is provided separate from the walking beam, to carry said lock means.

4. Apparatus as defined by claim 3, wherein said member is in the form of an elongate secondary beam arranged in substantial parallelism with the walking beam.

5. Apparatus as defined by claim 4, wherein is provided means supporting said secondary beam for longitudinal shiftability; and means including said lock means for translating limited movements of the walking beam to said secondary beam.

6. Apparatus as defined by claim 5, wherein the means last mentioned includes a device for effecting a delayed translation of walking beam movement in the direction of retraction of the walking beam, to said secondary beam.

7. Apparatus as defined by claim 4, wherein said member carries lock means approximating in number the number of pushers carried by the walking beam.

8. Apparatus as defined by claim 7, wherein the lock means are spaced from one another along said member in correspondency with the spacing of the pushers upon the walking beam.

9. Apparatus as defined by claim 3, wherein said lock means are fixed against movement relative to said carrier member.

10. Apparatus as defined by claim 1, wherein a member is provided apart from the walking beam, as a carrier for said lock means.

11. Apparatus as defined by claim 1, wherein the lock means are deactivated following each advance stroke of the walking beam.

12. Apparatus as defined by claim 1, wherein the walking beam moves to deactivate the lock means substantially in unison.

13. An accumulative conveyor apparatus for trolleys to be advanced and spaced apart along a trolley rail, said apparatus comprising in combination: a substantially horizontal trolley rail for the support of a plurality of load-carrying trolleys; an elongate walking beam reciprocable in parallelism with the trolley rail, and means for reciprocating said beam between fully retracted and fully advanced stroke positions; a plurality of pushers pivotally mounted upon said walking beam for swinging movement in a common plane, said pushers being uniformly spaced from one another along the beam, and each including a stop to limit swinging thereof in the direction of retraction of the beam, said pushers being rigidified by the stops to abut and advance trolleys along the rail incident to shifting of said beam in the direction of advancement thereof; and lock means operative upon each pusher while the pusher is in motion with the advancing trolley, for locking the pusher at the aforesaid position of rigidity, including means to deactivate said lock means incident to retraction of said walking beam from the advanced position, for restoring swingability of said pushers about their pivots.

14. Apparatus as defined by claim 13, wherein said lock means includes a plurality of laterally extended lock bars approximating in number the number of pushers, and an elongate reciprocable secondary beam member in substantial parallelism with said walking beam, said lock bars being mounted upon said secondary beam member in spaced relation corresponding to the spacing of the pushers upon said walking beam, and means for longitudinally shifting said secondary beam member to position the lock bars in alternate locking engagement and disengagement with the pushers.

15. Apparatus as defined by claim 14, wherein the power for shifting the secondary beam member is obtained from the walking beam.

16. Apparatus as defined by claim 14, wherein the secondary beam member is parallel to and substantially coextensive in length with said walking beam.

17. Apparatus as defined by claim 16, wherein is included bearing means supporting the walking beam and the secondary beam member for reciprocation above and in substantial parallelism with the trolley rail.

18. Apparatus as defined by claim 14, wherein the walking beam and the secondary beam member each includes a depending web and an overlying head, one of said webs carrying the pushers and the other of said webs carrying the lock bars.

19. Apparatus as defined by claim 18, wherein said overlying heads each includes a substantially horizontal flange supported by and slidable upon said bearing means.

20. Apparatus as defined by claim 18, wherein the lock bars are fixed to their associated web, and are extended substantially horizontally into the path of advancement of the pushers in position to be struck and moved by the pushers during an advancing stroke of the walking beam, thereby to effect a shifting of the secondary beam member carrying said lock bars, and means operative upon retraction of the walking beam for effecting a delayed retraction of the secondary beam member.

21. Apparatus as defined by claim 14, wherein the lock bars are fixed to the secondary beam member and are extended substantially horizontally into the path of advancement of the pushers in position to be struck and moved by the pushers during an advancing stroke of the walking beam, thereby to effect a shifting of the secondary beam member, and means operative upon retraction of the walking beam for effecting a delayed retraction of the secondary beam member.

22. Apparatus as defined by claim 21, wherein the means last mentioned acts to displace the secondary beam member to a position of full retraction substantially concurrently with full retraction of the walking beam.

23. An accumulative conveyor apparatus for trolleys to be advanced and spaced apart along a trolley rail, and comprising in combination: a trolley rail for the support of a plurality of trolleys; an elongate reciprocable actuator member, and means for moving said member between fully retracted and fully advanced stroke positions; a multiplicity of pushers to engage each trolley and to advance the trolleys during an advance stroke of the actuator member; means to lock the pushers through at least a portion of each advance stroke, and to unlock the pushers during the retractible stroke of the actuator member.

24. Apparatus as defined by claim 23, wherein the unlocked pushers on the retractile stroke override the trolleys without moving the trolleys along the rail.

* * * * *